United States Patent [19]

Vilmur

[11] Patent Number: 4,520,474

[45] Date of Patent: May 28, 1985

[54] DUPLEX COMMUNICATION TRANSCEIVER WITH MODULATION CANCELLATION

[75] Inventor: Richard J. Vilmur, Palatine, Ill.

[73] Assignee: Motorola, Inc., Schaumburg, Ill.

[21] Appl. No.: 558,685

[22] Filed: Dec. 5, 1983

[51] Int. Cl.³ .......................... H04B 3/20; H04L 5/14
[52] U.S. Cl. ....................................... 370/24; 370/32; 455/76; 455/87
[58] Field of Search ....................... 370/24, 30, 32, 36; 455/63, 73, 86, 87, 76

[56] References Cited

U.S. PATENT DOCUMENTS

| | | | |
|---|---|---|---|
| 3,113,269 | 12/1963 | Essam | 370/24 |
| 3,931,575 | 1/1976 | Amoroso, Jr. | 455/87 |
| 4,052,672 | 10/1977 | Enderby | 455/112 |
| 4,134,068 | 1/1979 | Richardson | 370/24 |
| 4,186,344 | 1/1980 | Higuchi | 455/86 |
| 4,194,151 | 3/1980 | Gregersen | 455/87 |
| 4,231,116 | 10/1980 | Sekiguchi | 370/30 |
| 4,238,850 | 12/1980 | Vance | 370/24 |
| 4,449,250 | 5/1984 | Kurby | 455/76 |

OTHER PUBLICATIONS

"Advanced Mobile Phone System—800 MHZ High Capacity Mobile Radio Telephone", Instruction Manual #68P81039E25-A, FIG. 1, showing Mobile transceiver schematic.

"Introduction to Radar Systems", Second Edition, by Merrill I. Skolnik, 1962, pp. 88-91.

Primary Examiner—Joseph A. Orsino, Jr.
Assistant Examiner—Timothy K. Greer
Attorney, Agent, or Firm—Phillip H. Melamed; James W. Gillman; John H. Moore

[57] ABSTRACT

A duplex FM communication transceiver 10 is disclosed in which a modulated transmit carrier signal is utilized as the receiver first mixer (32) injection signal. The receiver portion of the transceiver comprises dual conversion circuitry, and the transmit information signal used for modulating the transmit carrier signal is phase and amplitude adjusted and then utilized to modulate the receiver second injection local oscillator 41 which provides the input injection signal to the receiver second mixer 36. The second mixer substantially cancels all of the transmit information signal and provides just received information signals to a demodulator 43 which provides audio signals to a speaker 46.

10 Claims, 3 Drawing Figures

DUPLEX COMMUNICATION TRANSCEIVER WITH MODULATION CANCELLATION

BACKGROUND OF THE INVENTION

The present invention relates to the field of duplex communication transceivers, and more particularly to FM duplex transceivers which utilize dual conversion receiver circuitry wherein the received signal is frequency converted to a first IF signal, then frequency converted to a second IF signal, and then demodulated.

In duplex communication transceivers, the transmitter and receiver portions of the transceiver are both simultaneously operative. In some of these systems the difference between the frequency of the transmit carrier signal (the carrier signal to be radiated) and the frequency of the receive carrier signal equals the first IF (intermediate frequency) signal frequency, since the difference between the transmit and receive carrier frequencies equals the channel spacing between the transmit and receive signals. In addition, some of these transceivers utilize dual conversion receiver circuitry in order to obtain the benefits thereof wherein this circuitry involves the utilization of first and second mixers for converting the received carrier signal to a first IF signal and then to a second IF signal, respectively.

In FM (frequency modulation) duplex communication transceivers such as those described above, typically the first injection signal supplied to the receiver first mixer is provided by a first local oscillator and comprises a fixed frequency signal. In some transceivers, the transmit carrier signal and the receiver first mixer injection signal are related since the fixed frequency receiver injection signal is developed first and then the modulated transmit carrier signal is produced through the use of a sidestep transmit mixer which mixes the receiver first injection signal with an offset signal, modulated by a transmit information signal, which is developed by an offset oscillator. While such transceivers provide for having the receive and transmit carrier frequencies track each other, thus enabling the transceiver to be readily tuned to any of a number of different channels, these systems typically require the utilization of an offset oscillator and sidestep mixer and therefore are relatively costly. This cost disadvantage essentially occurs in each such prior transceiver where the modulated transmit signal is not produced by direct modulation of an oscillator providing as its output the transmit carrier signal or a subharmonic thereof. Even in transceivers where the frequency difference between the transmit and receive carriers is the IF frequency, these transceivers require an additional transmit modulation stage if the transmit carrier is first generated and used as the receiver first injection signal and the transmit carrier is then modulated by the transmit information signal. It is more cost effective to directly modulate the transmit carrier oscillator than to provide a fixed frequency transmit carrier signal and then provide an additional modulation stage. Thus in prior transceivers such as those discussed above either additional mixers and/or modulators and/or oscillators are utilized in order to provide both the modulated transmit carrier signal to be radiated and the first injection signal used for the receiver first mixer.

The present invention deals with a technique for utilization of the modulated transmit signal as the first receiver injection signal for the first mixer. In such systems there is a problem of cancellation of the transmit modulation in the receiver circuitry. One prior system uses costly additional filtering and an additional IF transmitter mixer such that the modulated transmit signal, after filtering removes the transmit modulation, can be used as the receiver first injection signal. Obviously this solution is not cost effective since it requires additional mixer and filter stages and it also creates additional transmitter spurious signals. In a copending U.S. patent application, Ser. No. 332,432, filed Dec. 21, 1981 to Kurby, entitled, "Radio-Frequency Synthesizer for Duplex Radios", and assigned to the same assignee as the present invention, another type of cancellation solution is proposed. However, that solution is not cost effective since it utilizes an additional offset oscillator and sidestep mixer in order to provide the transmit carrier signal which is modulated by the transmit information signal. In both of these prior systems the signal actually used as the receiver first injection signal is an unmodulated constant frequency signal since the transmit modulation has been previously removed from the receiver first injection signal either by filtering or by cancellation.

In a prior doppler radar system a transceiver is disclosed in which the modulated transmit signal is used directly as a receiver first injection signal, but in this system typically the receive and transmit carriers have identical frequencies, except for any doppler frequency shift. Also in this system the end result is not demodulation of the modulating receive signal information, which is identical to the transmit modulation signal information, but the end result is the production of the doppler frequency shift signal. In other words, the transmit carrier and its modulation signal are used to cancel the receive carrier signal and its modulation, and thereby isolate the doppler signal. Thus obtaining the received modulating signal is not obtained by and is not an object of this prior radar system, and this is contrary to most communication transceivers, including those of the present invention.

SUMMARY OF THE INVENTION

It is an object of the present invention to provide a duplex communication transceiver which overcomes the above mentioned deficiencies of prior transceivers.

More particularly, it is an object of the present invention to provide a relatively inexpensive duplex communication transceiver which avoids providing a fixed frequency receiver first mixer injection signal separate from the modulated transmit signal.

In one embodiment of the present invention there is provided a duplex communication transceiver. The transceiver comprises: transmitter means for providing information transmission on an output signal comprising a first (transmit) carrier signal having a first predetermined frequency and modulated by a first information signal; receiver means, coupled to and simultaneously operable with said transmitter means, for receiving an input signal comprising a second (receive) carrier signal having a second predetermined frequency different from said first frequency and modulated by a second information signal different from said first information signal; said receiver means effectively demodulating said input signal and providing said second information signal in response thereto; said receiver means including; a first mixer means coupled to said transmitter means for receiving said modulated first and second carrier signals and for providing, in response thereto, a first IF signal modulated with said first and second information signals, said first IF signal having an IF frequency comprising an arithmetic combination of the frequencies of the first and second carrier signals, a first IF means fixed tuned to said IF frequency and coupled to said first mixer means for receiving and passing said first IF signal and rejecting signals at substantially different frequencies, a second mixer means coupled to said first IF means for receiving said passed modulated first IF signal therefrom and also receiving, from a local oscillator means, a local oscillator carrier signal having a predetermined local oscillator frequency and modulated by a signal related to said first information signal, and for providing in response thereto a modulated second IF signal having a second IF frequency comprising the arithmetic combination of said first IF frequency and said local oscillator frequency, signal adjustment means coupled to said transmitter means and said local oscillator means for receiving said first information signal from said transmitter means and adjusting it to provide said modulating related signal such that said second mixer means cancels said first information signal modulation contained in said first IF signal so that said second IF signal substantially comprises a carrier signal at said second IF frequency modulated by substantially just said second information signal, and demodulator means coupled to said second mixer means for receiving said modulated second IF signal and providing said second information signal in response thereto.

Essentially the present invention provides for utilization of the modulated transmit signal (the signal to be radiated by the transceiver) as the receiver first mixer injection signal. In the present invention a related signal to the modulating information signal of the transmit carrier signal is provided by a phase and amplitude adjustment circuit and is used for providing a modulating input to a second local oscillator which provides the injection signal to a second receiver mixer. Phase and amplitude adjustment of the modulating transmit information signal is accomplished by the adjustment circuit such that said receiver second mixer substantially cancels all of the first (transmit) information signal modulation so that only the received modulation signal is provided as the modulation of the second IF signal output of the second mixer. This technique of cancelling the modulation used for modulating the transmit signal of the transceiver is cost effective since no additional oscillators, mixers, or modulating stages are required other than stages which provide the modulated transmit signal and which provide for the direct modulation of the second local oscillator signal which is used as the injection signal for the receiver second mixer. Thus the present invention has provided a cost effective duplex communication transceiver.

The present technique is especially advantageous when the transceiver is to operate over a number of discrete channels. In such a transceiver the modulation of the transmit carrier signal comprises modulating a voltage controlled oscillator (VCO) which is part of a phase locked loop wherein the output of the voltage controlled oscillator is determined in accordance with the frequency division accomplished by a programmable frequency divider contained within the phase locked loop.

BRIEF DESCRIPTION OF THE DRAWINGS

For a more complete understanding of the present invention, reference should be made to the drawings, in which.

DESCRIPTION OF THE PREFERRED EMBODIMENT

Figure 1:
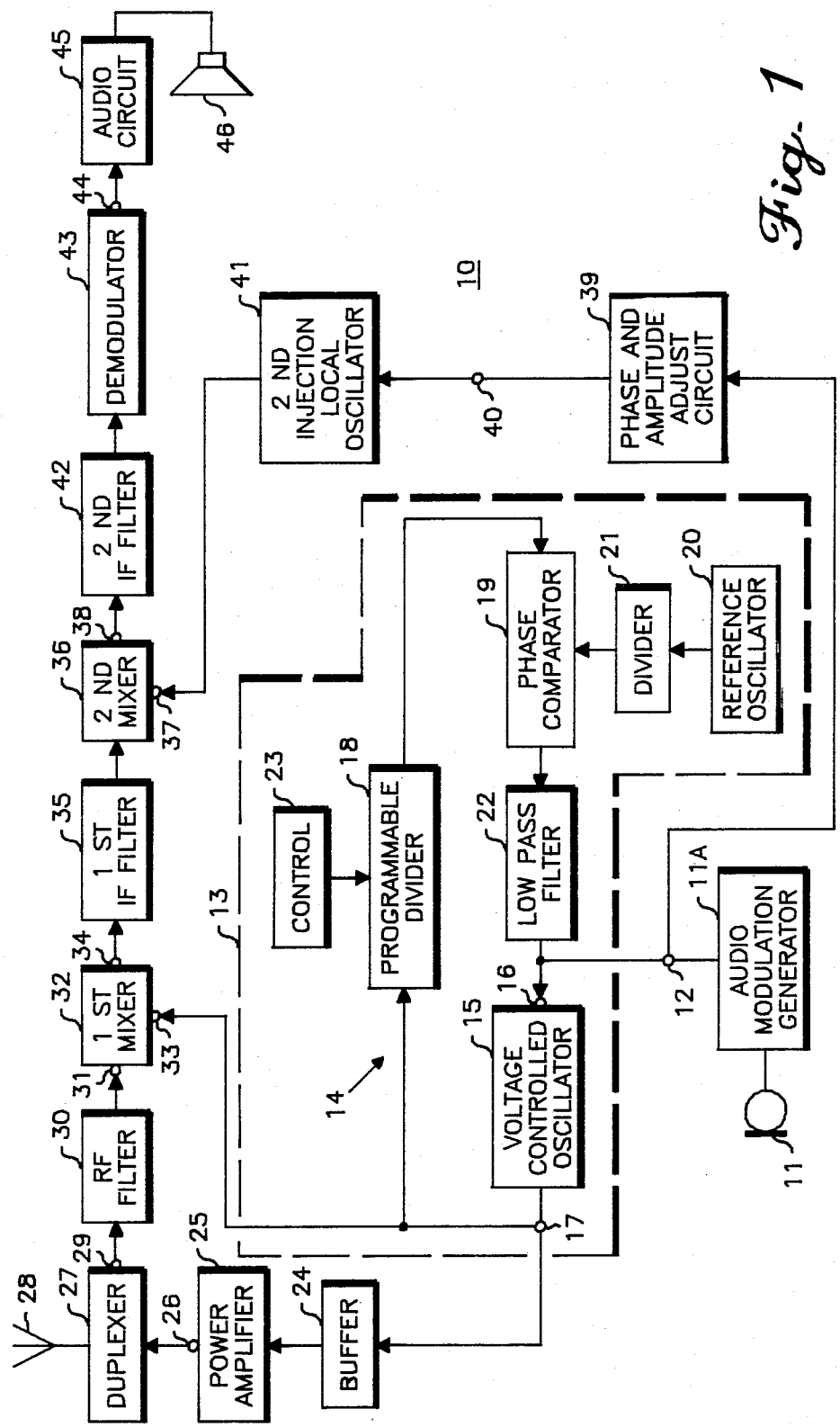
FIG. 1 is a schematic diagram of a duplex FM communication transceiver constructed in accordance with the present invention.

Referring now to FIG. 1, a duplex FM communication transceiver 10 is illustrated as being constructed in accordance with the modulation cancellation technique of the present invention. The transceiver 10 includes a microphone 11 which is coupled to and provides an input signal to an audio circuit 11A that provides, at an output terminal 12, a modulating audio signal designated herein as the first (transmit) information signal. The elements 11 and 11A together comprise an audio signal generator. The signal at the terminal 12 will be utilized to provide modulation to a transmit carrier signal that is to be radiated by the duplex transceiver 10, and the signal at the terminal 12 will also be utilized to provide a related signal used for modulation cancellation in the receiver portion of the transceiver 10.

The transceiver 10 includes a transmit local oscillator means 13 shown dashed in FIG. 1. The transmit oscillator means 13 comprises a phase locked loop 14 comprising a voltage controlled oscillator (VCO) 15 which has an input control terminal 16 and an output terminal 17. The output terminal 17 is directly connected as an input to a programmable frequency divider 18 whose output is coupled as an input to a phase comparator 19. The phase comparator is coupled to a highly stable reference oscillator 20 via a fixed frequency divider circuit 21 with the divider 21 providing a second input to the phase comparator 19. The output of the phase comparator is provided as an input to a low pass filter 22 whose output is directly coupled to the control terminal 16 of the VCO 15. The divide by relationship of the programmable divider 18 is controlled by a control circuit 23 coupled thereto. The elements 15 through 22 comprise the phaselock loop 14.

The phase locked loop 14 operates in accordance with well known principles such that the output frequency provided at the terminal 17 by the VCO 15 will be maintained at a frequency bearing a predetermined relationship to the frequency of the highly stable reference oscillator 20 which is typically a crystal controlled oscillator. The relationship between the frequency of the signal at the terminal 17 and the frequency of the output signal of the reference oscillator 20 is determined by the frequency divide by relationship provided by the divider 18, and that relationship is in turn controlled by the control circuit 23 shown in FIG. 1. The operation of all the elements 15 through 23 shown in FIG. 1 is well known and therefore will not be discussed in great detail. It is understood that the phase comparator 19 compares the output of the programmable divider 18 to the stable frequency provided by the divider 21 and provides a resultant phase comparison signal to the low pass filter 22 so as to provide a frequency control bias voltage at the terminal 16 to maintain the output of the VCO 15 at the terminal 17 at a relative constant frequency.

Modulation of the output signal at the terminal 17 of the phase locked loop 14 is readily accomplished by virtue of a direct connection of the terminal 12 to the terminal 16. This results in directly providing, at the terminal 17, a frequency modulated (FM) signal comprising a transmit carrier signal frequency modulated by the audio information signal present at the terminal 12. The operation of the above described circuit configuration is well known to those of average skill in the art. While a phase locked loop 14 is shown in the oscillator 13, a stable crystal oscillator which can be directly modulated by the audio signal at terminal 12 could also be used. It is also well known that a separate modulation terminal of the VCO 15, rather than the terminal 16, could be connected to terminal 12 and used to modulate the VCO output.

The modulated transmit signal provided at the terminal 17 is coupled as an input to a buffer circuit 24 and the output of the buffer circuit is coupled as an input to a power amplifier stage 25. The output of the power amplifier stage is provided at a terminal 26 that comprises an input transmit terminal of a duplexer circuit 27 which is coupled to a transmit-receive antenna 28 and also to a receiver terminal 29. Essentially the elements 11 through 28 comprise the transmitter portion of the FM transceiver 10. The modulated transmit signal at the terminal 26 will be radiated by the antenna 28, and the antenna will provide a modulated receive signal at terminal 29 in response to received RF radiation.

The operation of the duplexer 27 is well known to those of average skill in the art and essentially comprises enabling the transmitter and receiver portions of the transceiver 10 to simultaneously utilize the antenna 28 without substantial interference. In other words, the duplexer 27 insures that the modulated transmit signal at terminal 26 will not be substantially present at the receiver terminal 29, and that the power amplifier 25 will effectively see only the antenna 28 as its output load. Since duplexers such as the duplexer 27 are well known the construction of this element will not be discussed any further.

The receiver portion of the transceiver 10 comprises an RF filter 30 which may be part of the duplexer 27. The filter 30 receives its input from the receiver terminal 29 and provides an output signal to an input terminal 31 of a receiver first mixer 32. The first mixer 32 receives a receiver injection signal provided at a terminal 33, wherein according to the present invention the terminal 33 is directly connected to the transmitter VCO output terminal 17. The significance of this is that the first mixer 32 receives not only an information modulated receiver carrier signal provided at the terminal 31 but also the modulated transmitter carrier signal at the terminal 17. In response to the signals provided at the terminals 31 and 33, the receiver first mixer 32 provides an output at an IF terminal 34 comprising an IF carrier signal which is modulated by both the receiver modulation information signal present at the terminal 31 and the transmitter modulation signal present at the terminal 33. The frequency of the IF carrier signal at the terminal 34 comprises an arithmetic combination of the receiver carrier frequency present at the terminal 31 and the transmit carrier frequency present at the terminal 33. While typically this arithmetic combination is taken to be the difference between the receive and transmit frequencies, of course this IF signal could be the difference between harmonics of these signals or subharmonics thereof. The mixer 32 functions as the first frequency converter in a superheterodyne dual conversion receiver.

The IF terminal 34 is coupled as an input to a first IF filter 35 which essentially is fixed tuned to the frequency of the IF carrier signal provided at the terminal 34 and receives and passes the IF signal at this frequency while rejecting signals at substantially different frequencies. Of course the passband of the first IF filter 35 is sufficient to pass the IF carrier sideband modulation information signals corresponding to the modulation signals provided at each of the terminals 31 and 33, wherein these signals now modulate the IF carrier signal.

The output of the first IF filter 35 is provided as an input signal to a second mixer stage 36 which receives an additional mixing input signal (a second injection signal) from a receiver second injection terminal 37. The second mixer circuit 36 provides, at an output terminal 38, a resultant second IF signal comprising a second IF carrier signal having a frequency related to the arithmetic combination of the frequency of the first IF carrier signal and the carrier frequency of the second injection signal at the terminal 37. In addition, the second IF carrier signal at the terminal 38 is modulated by the modulation present on the first IF carrier signal as well as the modulation present on the second injection signal at the terminal 37. It is contemplated that the resultant modulation at the terminal 37 will be such that only the received information signal modulation will be substantially provided as the modulating signal for the second IF carrier signal provided at the terminal 38. This is accomplished in the following manner.

The first information audio signal provided at the terminal 12 which is utilized to provide the modulation for the transmit signal at the terminal 17 is coupled as an input to a phase and amplitude adjustment circuit 39. The circuit 39 provides, at an output terminal 40, a related output signal corresponding to the audio signal at the terminal 12 but adjusted in amplitude and phase by the circuit 39. This related audio signal at the terminal 40 is provided as an input to a receiver second injection local oscillator 41 which provides, at the terminal 37, a fixed frequency injection carrier signal modulated by the related audio signal at the terminal 40. In the absence of the related signal at terminal 40, the local oscillator 41 provides a fixed frequency output signal to the terminal 37. It is contemplated that the degree of phase and amplitude adjustment provided by the circuit 39 is such that the second mixer circuit 36 will result in the cancellation of the transmit modulation information provided at the terminal 33 such that the only remaining modulation at the terminal 38 will substantially comprise the receive information modulation present at the terminal 29.

The modulated second IF signal at the terminal 38 is provided as an input to a second IF filter stage 42 which passes signals at substantially the second IF carrier signal frequency but blocks signals at substantially different frequencies. The output of the second IF filter 42 is provided to an FM demodulator circuit 43 which provides at its output terminal 44 the received information modulation signal present at the terminal 29. The terminal 44 is provided as an input to an audio circuit 45 which has its output coupled to a speaker 46 for audible reproduction of the received modulation signal provided at the terminal 44.

The configuration of the transceiver 10 disclosed above provides for the dual use of the modulated transmit signal provided at the terminal 17 by the transmitter local oscillator 13. This modulated transmit signal is not only utilized by the buffer stage 24 and power amplifier 25 to provide the transmit signal which is to be radiated by the transceiver, but is also utilized as the receiver first mixer injection signal provided at the terminal 33. Of course this results in providing at the first mixer output terminal 34 modulation related not only to the received information modulation at the terminal 31 but also modulation related to the transmit modulation present at the terminal 17. This transmit modulation is then effectively cancelled by the second mixer circuit 36 by virtue of the phase and amplitude adjustment circuit 39. The circuit 39 provides a related transmit modulation signal at the terminal 40 which is utilized to directly FM modulate the output of the receiver second injection local oscillator 41 that provides one input to the second mixer circuit 36. The amount of phase and amplitude adjustment provided by the circuit 39 is selected to compensate for any attenuation and phase adjustment provided to the transmit modulation signal by the first mixer 32 and first IF filter 35.

In this manner, the receiver portion of this transceiver 10, which comprises a dual conversion receiver configuration comprising elements 27–46, 11 and 11A, is not required to utilize a separate and additional oscillator for generating the receiver first mixer injection signal to be provided at the terminal 33. In addition, when the transmit carrier frequencies at the terminal 17 are to be stepped over a number of different transmit frequencies because the transceiver 10 is to be tunable to a number of different channels, frequency of the receiver first injection signal will automatically track the transmit carrier frequency variation. Additionally, since the frequency difference between the transmit carrier signal at the terminal 17 and the receive carrier signal at the terminal 29 is equal to the frequency of the first IF carrier signal, the present invention does not require any offset oscillator or sidestep mixer. Also, since the present invention directly modulates the output of the VCO 15, no additional modulation stages are required for the transmitter portion of the transceiver. The FM modulation of the receiver second injection local oscillator 41 can be readily accomplished through the use of a voltage controlled oscillator or crystal controlled oscillator responsive to the related signal at the terminal 40 provided by the phase and amplitude adjustment circuit 39.

It should be noted that while the transmit signal at the terminal 17 is shown directly connected to the receiver first mixer injection terminal 33, a multiplier stage could be inserted between the terminals 17 and 33 or a subharmonic filter stage could be inserted therein such that harmonics or subharmonics of the transmit carrier signal at the terminal 17 would provide the receiver injection signal at the terminal 33. Of course in this case the IF frequency at the terminal 34 would be an arithmetic function of whatever frequencies comprise the carrier signals provided at the terminals 31 and 33.

Figure 2:
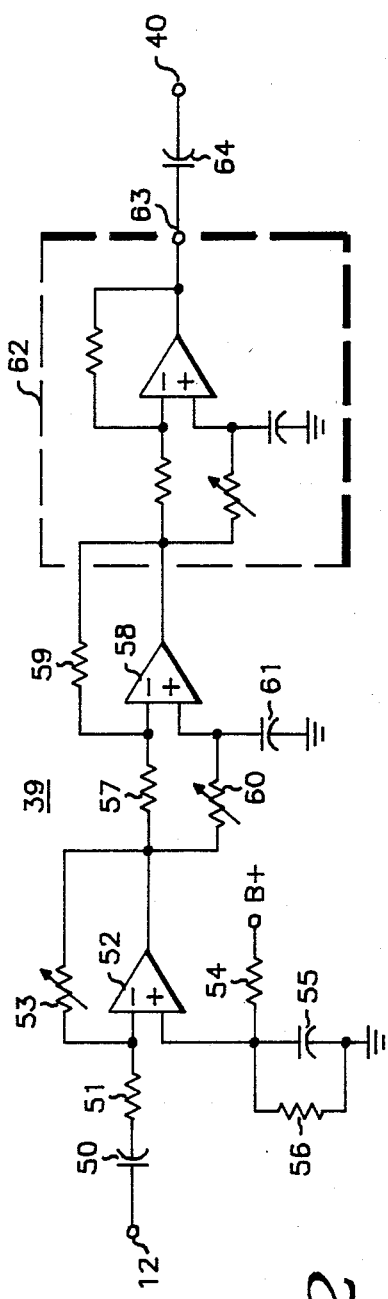
FIG. 2 is a schematic diagram of a phase and amplitude adjustment circuit illustrated in block form in FIG. 1.

FIG. 2 illustrates one embodiment for the phase and amplitude adjustment circuit 39 shown in FIG. 1 which is coupled between the terminals 12 and 40. The circuit shown in FIG. 2 comprises a capacitor 50 connected in series with a resistor 51 between the terminal 12 and a negative input terminal of an operational amplifier 52. An adjustable resistance 53 is provided in a feedback loop between the output of the operational amplifier 52 and its negative input. The magnitude of the resistance 53 is selectable and will control the amplitude of the signal provided as the output of the amplifier 52. The positive input of the amplifier 52 is connected to a B+ power supply terminal through a resistor 54 and is connected to ground through the parallel combination of a capacitor 55 and a resistor 56. The output of the amplifier 52 is connected through a resistor 57 to the negative input terminal of an operational amplifier 58 which has a stability feedback resistor 59 connected between its output and its negative input. The output of the amplifier 52 is also connected to the positive input terminal of the amplifier 58 via an adjustable resistance 60, with an integrating capacitor 61 being connected between the positive input terminal of the amplifier 58 and ground. The elements 60 and 61 combine to form an adjustable all pass filter to provide a predetermined phase shift for the amplified signal at the output of the amplifier 58. The output of the amplifier 58 is provided to a subsequent operational amplifier stage 62 which is arranged substantially identical to the amplifier stage comprising the operational amplifier 58. The stage 62 provides an output signal at a terminal 63 that is coupled through a DC isolation capacitor 64 to the terminal 40. The operational amplifier 52 is connected in series (cascade) with the amplifier 58 and stage 62.

Essentially the operational amplifier 52 and its adjustable resistance 53 provide an amplitude adjustment while the operational amplifier 58 and the adjustable resistance 60, together with the substantially identical adjustable stage 62, determine a predetermined phase shift for the signal at the terminal 63. Thus, the elements shown in FIG. 2 combine to provide an amplitude and phase adjusted signal at the terminal 40 which is related to the transmit information modulation signal present at the terminal 12. It is contemplated that the amount of amplitude and phase adjustment provided by the circuit 39 shown in FIG. 2 and in FIG. 1 will compensate for the phase and amplitude adjustment of the transmit modulation signal present at the terminal 33 provided by the first mixer circuit 32 and the first IF filter 35. This will result in the cancellation of this transmit modulation information signal such that only the received information modulation signal will modulate the second IF carrier signal present at the terminal 38. The circuit 39 in FIG. 2 provides substantial signal isolation between the signals at terminals 12 and 40 due to the use of operational amplifier stages.

It should be noted that preferably the receive and transmit information modulation signals comprise different signals and the receive and transmit carrier signals have different frequencies.

Figure 3:
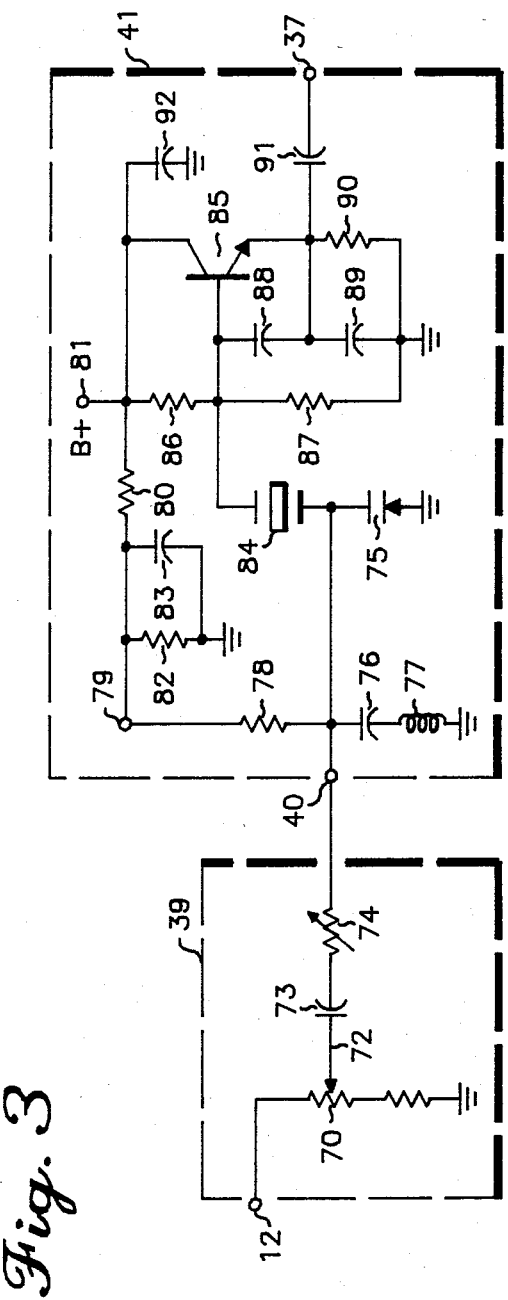
FIG. 3 is a schematic diagram illustrating another embodiment of the phase and amplitude adjustment circuit illustrated in FIG. 1.

Referring now to FIG. 3, there is illustrated an additional embodiment for the phase and amplitude adjustment circuit 39 along with an embodiment for the receiver second injection local oscillator 41. In FIG. 3 identical reference numerals are used to indicated corresponding elements to those in FIG. 1. FIG. 3 represents a cost effective implementation of the phase and amplitude adjustment circuit 39 wherein fewer and less expensive elements are utilized for the adjustment circuit 39.

In FIG. 3, the terminal 12, at which the transmit audio information signal is provided, is coupled to ground through a series resistance element 70 having an adjustable center tap arm 72 which is directly connected to one end of a blocking capacitor 73. The other end of the capacitor 73 is series connected through a variable resistance 74 to the terminal 40 at which the amplitude and phase adjusted related signal is provided as a modulating input signal to the receiver second injection local oscillator 41. In FIG. 3 the elements 70 through 74 are illustrated as comprising the amplitude and phase adjustment circuit, but it should be noted that the phase adjustment provided by this circuit depends upon the amplitude of the variable resistance 74 in combination with the reactance of the frequency determining reactance elements in the local oscillator 41 which determine the frequency of the local oscillator carrier signal.

In FIG. 3, the second injection local oscillator 41 is illustrated as comprising a reverse biased varactor diode 75 having its cathode directly connected to the terminal 40 and its anode directly connected to ground. The terminal 40 is also connected to ground through the series connection of a blocking capacitor 76 and an inductor 77. Bias is supplied to the varactor diode 75 by virtue of a resistor 78 connected between the terminal 40 and a terminal 79 at which a positive bias voltage is provided by virtue of a resistor 80 being connected between this terminal and a positive B+ terminal 81. A parallel connected resistor 82 and capacitor 83 are connected between the terminal 79 and ground. Essentially, the reactance of the elements 75 through 77 combine with the variable resistor 74 to form a low pass filter which provides a selectable desired phase adjustment for the related signal provided at the terminal 40.

The terminal 40 is coupled through a frequency determining crystal 84 to the base of an NPN transistor 85 having its collector directly connected to the terminal 81 and its base connected through a bias resistor 86 to the terminal 81. The base of the transistor 85 is also connected to ground through a biasing resistor 87 and is coupled through a capacitor 88 to its emitter. The emitter of the transistor 85 is coupled to ground through a capacitor 89 connected in parallel with a resistor 90, and the emitter is connected through a blocking capacitor 91 to the input terminal 37 of the second mixer stage 36. The B+ terminal 81 is connected to ground through a holding capacitor 92. The elments 75 through 92 comprise the receiver second injection local oscillator 41.

Essentially, the local oscillator 41 shown in FIG. 3 comprises a voltage controlled crystal oscillator wherein a varactor diode 75 receives the amplitude and phase adjusted related signal at the terminal 40 and provides a variable capacitance which effectively frequency modulates the nominal output frequency of the oscillator to provide the desired FM modulated output signal at the terminal 37. The phase and amplitude adjustment circuit 39 of the embodiment shown in FIG. 3 is substantially less expensive than that shown in FIG. 2 since it does not include any operational amplifiers. In FIG. 3 the amplitude adjustment for the related signal is performed by the center tapped resistance 70 while the phase adjustment is provided by the variable resistor 74 in combination with the reactance of the frequency determining elements of the local oscillator 41. This latter configuration avoids the necessity of providing any additional reactance element corresponding to the capacitor 61 shown in FIG. 2.

While I have shown and described specific embodiments of the present invention, further modifications and improvements will occur to those skilled in the art. All such modifications which retain the basic underlying principles disclosed and claimed herein are within the scope of this invention.

I claim:

1. A duplex communication transceiver comprising:
   transmitter means for providing for information transmission an output signal comprising a first carrier signal having a first predetermined frequency and modulated by a first information signal;
   receiver means, coupled to and simultaneously operable with said transmitter means, for receiving an input signal comprising a second carrier signal having a second predetermined frequency different from said first frequency and modulated by a second information signal different from said first information signal, said receiver means effectively demodulating said input signal and providing said second information signal in response thereto;
   said receiver means including;
   a first mixer means coupled to said transmitter means for receiving said modulated first and second carrier signals and for providing, in response thereto, a first IF signal modulated with said first and second information signals, said first IF signal having an IF frequency comprising an arithmetic combination of the frequencies of said first and second carrier signals,
   a first IF means fixed tuned to said IF frequency and coupled to said first mixer means for receiving and passing said first IF signal and rejecting signals at substantially different frequencies,
   a second mixer means coupled to said first IF means for receiving said passed modulated first IF signal therefrom and also receiving, from a local oscillator means, a local oscillator carrier signal having a predetermined local oscillator frequency and modulated by a signal related to said first information signal, and for providing in response thereto a modulated second IF signal having a second IF frequency comprising the arithmetic combination of said first IF frequency and said local oscillator frequency,
   signal adjustment means coupled to said transmitter means and said local oscillator means for receiving said first information signal from said transmitter means and adjusting it to provide said modulating related signal such that said second mixer means cancels said first information signal modulation contained in said first IF signal so that said second IF signal substantially comprises a carrier signal at said second IF frequency modulated by just said second information signal, and
   demodulator means coupled to said second mixer means for receiving said modulated second IF signal and providing said second information signal in response thereto.

2. A duplex communication transceiver according to claim 1 wherein said transmitter means includes apparatus for radiating said transmitter output signal at RF frequencies and wherein said receiver means includes apparatus for providing said modulated second carrier signal in response to received RF radiation.

3. A duplex communication transceiver according to claim 1 wherein said signal adjustment means comprises phase and amplitude adjustment apparatus to adjust the phase and amplitude relationship of said related signal to said first information signal to obtain the cancellation of said first information signal in said second IF signal.

4. A duplex communication transceiver according to claim 3 wherein the amount of phase and amplitude adjustment provided by said signal adjustment means compensates for the attenuation and phase adjustment provided to said first information signal by said first mixer means and said first IF means.

5. A duplex communication transceiver according to claim 4 wherein said transmitter means utilizes frequency modulation to modulate said first carrier signal with said first information signal and wherein said demodulator means utilizes frequency demodulation circuitry to provide said second information signal in response to said second IF signal.

6. A duplex communication transceiver according to claim 5 wherein said transmitter means includes a first carrier signal oscillator for receiving said first information signal and FM modulating said first carrier signal therewith to provide said transmitter output signal.

7. A duplex communication transceiver according to claim 6 wherein said receiver means includes a voltage controlled oscillator means for receiving said related signal and providing an FM modulated signal as said modulated local oscillator carrier signal which is coupled to said second mixer means.

8. A duplex communication transceiver according to claim 7 wherein said voltage controlled oscillator means provides a fixed frequency output signal in the absence of said related signal.

9. A duplex communication transceiver according to claim 6 wherein said transmitter means includes audio signal generator means for providing an audio information signal as said first information signal.

10. A duplex communication transceiver according to claim 1 wherein said signal adjustment means comprises a circuit network for receiving said first information signal and providing in response thereto said related signal, said network comprising a first operational amplifier stage having a preselected resistance in its feedback path to provide an amplitude adjustment and a second additional operational amplifier connected in series with said first operation amplifier having a preselected resistance coupled to a capacitor which together form an all pass filter connected in series with the input of said second operational amplifier to provide a phase adjustment.

* * * * *